US011481626B2

(12) United States Patent
Das et al.

(10) Patent No.: US 11,481,626 B2
(45) Date of Patent: Oct. 25, 2022

(54) GENERATING ATTRIBUTE-BASED SAMPLES

(71) Applicant: International Business Machines Corporation, Armonk, NY (US)

(72) Inventors: Payel Das, Yorktown Heights, NY (US); Tom D. J. Sercu, New York, NY (US); Kahini Wadhawan, Ferozepur (IN); Cicero Nogueira Dos Santos, Montclair, NY (US); Inkit Padhi, White Plains, NY (US); Sebastian Gehrmann, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 614 days.

(21) Appl. No.: 16/653,737

(22) Filed: Oct. 15, 2019

(65) Prior Publication Data

US 2021/0110255 A1     Apr. 15, 2021

(51) Int. Cl.
  *G06N 3/08*   (2006.01)
  *G06N 3/04*   (2006.01)
  *G06F 16/28*  (2019.01)
  *G06K 9/62*   (2022.01)

(52) U.S. Cl.
  CPC .............. *G06N 3/08* (2013.01); *G06F 16/285* (2019.01); *G06K 9/6267* (2013.01); *G06N 3/04* (2013.01)

(58) Field of Classification Search
  CPC .......... G06N 3/08; G06N 3/04; G06F 16/285; G06K 9/6267
  See application file for complete search history.

(56) References Cited

U.S. PATENT DOCUMENTS

| 10,671,889 B2 * | 6/2020 | Poole | G06N 3/084 |
| 10,776,712 B2 * | 9/2020 | Oono | G06N 20/00 |
| 10,817,750 B2 * | 10/2020 | Hazard | G06N 20/00 |
| 2020/0090002 A1 * | 3/2020 | Zhu | G06N 20/10 |

OTHER PUBLICATIONS

Nezhad, 2019, Elsevier, pp. 16-26.*
Mehta, 2019, Elsevier, pp. 1-124.*
Smith, Royal Statistical Society, 1993, pp. 3-23.*
Tolstikhn, Arxiv, 2018, pp. 1-18.*
Stansbury, D., "Rejection Sampling," The Clever Machine, Sep. 10, 2012, pp. 1-10.
Reitmaier et al., "Semi-Supervised Active Learning for Support Vector Machines: A Novel Approach that Exploits Structure Information in Data," arXiv, Oct. 14, 2016, pp. 1-35, retrieved from https://arxiv.org/pdf/1610.03995.pdf.
Calma et al., "Resp-kNN: A probabilistic k-nearest neighbor classifier for sparsely labeled data," IEEE, International Joint Conference on Neural Networks (IJCNN), 2016, pp. 4040-4047.

(Continued)

*Primary Examiner* — Michael I Ezewoko
(74) *Attorney, Agent, or Firm* — Zilka-Kotab, P.C.

(57)     ABSTRACT

A computer-implemented method according to one aspect includes training a latent variable model (LVM), utilizing labeled data and unlabeled data within a data set; training a classifier, utilizing the labeled data and associated labels within the data set; and generating new data having a predetermined set of labels, utilizing the trained LVM and the trained classifier.

17 Claims, 7 Drawing Sheets

(56) References Cited

OTHER PUBLICATIONS

Reitmaier et al., "Transductive active learning—A new semi-supervised learning approach based on iteratively refined generative models to capture structure in data," Elsevier, Information Sciences, vol. 293, 2015, pp. 275-298.
Wikipedia, "Rejection sampling," Wikipedia, accessed on Oct. 14, 2019, 8 pages, retrieved from https://en.wikipedia.org/wiki/Rejection_sampling.
Kingma et al., "Semi-supervised Learning with Deep Generative Models," Advances in Neural Information Processing Systems 27 (NIPS), 2014, pp. 1-9, retrieved from http://papers.nips.cc/paper/5352-semi-supervised-learning-with-deep-generative-models.pdf.
Sohn et al., "Learning Structured Output Representation using Deep Conditional Generative Models," Advances in Neural Information Processing Sytems 28, (NIPS), 2015, pp. 1-9, retrieved from https://papers.nips.cc/paper/5775-learning-structured-output-representation-using-deep-conditional-generative-models.pdf.
Hu et al., "Toward Controlled Generation of Text," Proceedings of the 34th International Conference on Machine Learning, PMLR 70, 2017, 10 pages, retrieved from https://arxiv.org/pdf/1703.00955.pdf.
Engel et al., "Latent Constraints: Learning to Generate Conditionally from Unconditional Generative Models," arXiv, Dec. 21, 2017, pp. 1-22, retrieved from https://arxiv.org/pdf/1711.05772.pdf.

* cited by examiner

GENERATING ATTRIBUTE-BASED SAMPLES

BACKGROUND

The present invention relates to latent variable models, and more specifically, this invention relates to the generation of sample data.

The generation of data fitting one or more predetermined labels has great value in today's society, as it ensures the value of such data. For example, it is desirable to generate peptides (short strings of amino acids) using character-level text generation, but such generated peptides are valuable when they are accurately labeled as having antimicrobial properties (conversely, peptides accurately labeled as having toxic properties are undesirable).

However, current methods for creating such data necessitate large quantities of labeled training data, and are resource-inefficient. There is therefore a need to efficiently and accurately create data fitting one or more predetermined labels.

SUMMARY

A computer-implemented method according to one aspect includes training a latent variable model (LVM), utilizing labeled data and unlabeled data within a data set; training a classifier, utilizing the labeled data and associated labels within the data set; and generating new data having a predetermined set of labels, utilizing the trained LVM and the trained classifier.

According to another aspect, generating the new data includes converting sampled data points from a latent space representation to a data representation, utilizing a trained decoder within the trained LVM.

In this way, new instances of data may be generated for a data set that contains both labeled and unlabeled instances of data, where such instances of data have a desired label, or a plurality of desired labels.

According to another aspect, a computer program product for generating attribute-based samples includes a computer readable storage medium having program instructions embodied therewith, where the computer readable storage medium is not a transitory signal per se, and where the program instructions are executable by a processor to cause the processor to perform a method including training, by the processor, a latent variable model (LVM), utilizing labeled data and unlabeled data within a data set; training, by the processor, a classifier, utilizing the labeled data and associated labels within the data set; and generating, by the processor, new data having a predetermined set of labels, utilizing the trained LVM and the trained classifier.

According to another aspect, training the LVM includes creating a latent space representation for the data set.

In this way, labels may not need to be defined prior to training the LVM, as new labels may be determined on-the-fly after training the LVM.

According to another aspect, a system includes a processor; and logic integrated with the processor, executable by the processor, or integrated with and executable by the processor, where the logic is configured to train a latent variable model (LVM), utilizing labeled data and unlabeled data within a data set; train a classifier, utilizing the labeled data and associated labels within the data set; and generate new data having a predetermined set of labels, utilizing the trained LVM and the trained classifier.

According to another aspect, a computer-implemented method includes training an encoder and decoder of a latent variable model (LVM), utilizing labeled data and unlabeled data within a data set; creating a latent space representation for the data set; determining an explicit density model for the data set, utilizing the latent space representation for the data set; determining a set of classifiers to identify which regions of the latent space representation are consistent with a predetermined set of labels; sampling data points within the latent space representation for the data set that are consistent with the predetermined set of labels, utilizing rejection sampling; and converting the sampled data points from a latent space representation to a data representation, utilizing the trained decoder.

In this way, sampling may be performed on an intersection of multiple attribute labels, even if the number of samples in that intersection is small.

According to another aspect, a computer program product for generating attribute-based samples includes a computer readable storage medium having program instructions embodied therewith, where the computer readable storage medium is not a transitory signal per se, and where the program instructions are executable by a processor to cause the processor to perform a method including training, by the processor, an encoder and decoder of a latent variable model (LVM), utilizing labeled data and unlabeled data within a data set; creating, by the processor, a latent space representation for the data set; determining, by the processor, an explicit density model for the data set, utilizing the latent space representation for the data set; determining, by the processor, a set of classifiers to identify which regions of the latent space representation are consistent with a predetermined set of labels; sampling, by the processor, data points within the latent space representation for the data set that are consistent with the predetermined set of labels, utilizing rejection sampling; and converting, by the processor, the sampled data points from a latent space representation to a data representation, utilizing a trained decoder of the LVM.

In this way, new labeled data may be created in a more efficient and effective manner, which may reduce an amount of computing resources (e.g., processing, storage, power, etc.) necessary to generate such labeled data.

Other aspects and embodiments of the present invention will become apparent from the following detailed description, which, when taken in conjunction with the drawings, illustrate by way of example the principles of the invention.

DETAILED DESCRIPTION

Figure 1:
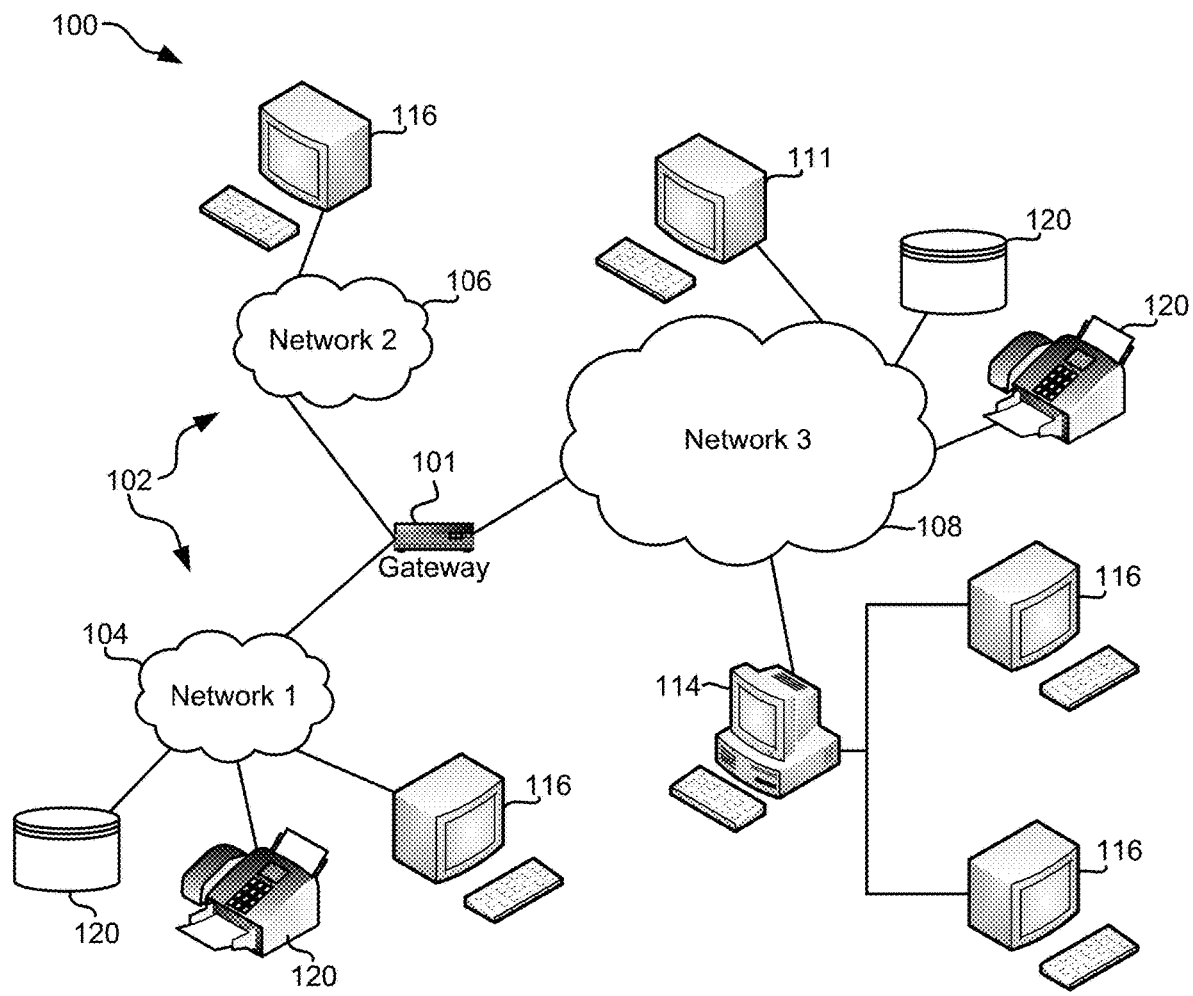
FIG. 1 illustrates a network architecture, in accordance with one aspect of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred aspects of systems, methods and computer program products for generating attribute-based samples.

In one general aspect, a computer-implemented method includes training a latent variable model (LVM), utilizing labeled data and unlabeled data within a data set; training a classifier, utilizing the labeled data and associated labels within the data set; and generating new data having a predetermined set of labels, utilizing the trained LVM and the trained classifier.

In another general aspect, generating the new data includes converting sampled data points from a latent space representation to a data representation, utilizing a trained decoder within the trained LVM.

In this way, new instances of data may be generated for a data set that contains both labeled and unlabeled instances of data, where such instances of data have a desired label, or a plurality of desired labels.

In another general aspect, a computer program product for generating attribute-based samples includes a computer readable storage medium having program instructions embodied therewith, where the computer readable storage medium is not a transitory signal per se, and where the program instructions are executable by a processor to cause the processor to perform a method including training, by the processor, a latent variable model (LVM), utilizing labeled data and unlabeled data within a data set; training, by the processor, a classifier, utilizing the labeled data and associated labels within the data set; and generating, by the processor, new data having a predetermined set of labels, utilizing the trained LVM and the trained classifier.

In another general aspect, training the LVM includes creating a latent space representation for the data set.

In this way, labels may not need to be defined prior to training the LVM, as new labels may be determined on-the-fly after training the LVM.

In another general aspect, a system includes a processor; and logic integrated with the processor, executable by the processor, or integrated with and executable by the processor, where the logic is configured to train a latent variable model (LVM), utilizing labeled data and unlabeled data within a data set; train a classifier, utilizing the labeled data and associated labels within the data set; and generate new data having a predetermined set of labels, utilizing the trained LVM and the trained classifier.

In another general aspect, a computer-implemented method includes training an encoder and decoder of a latent variable model (LVM), utilizing labeled data and unlabeled data within a data set; creating a latent space representation for the data set; determining an explicit density model for the data set, utilizing the latent space representation for the data set; determining a set of classifiers to identify which regions of the latent space representation are consistent with a predetermined set of labels; sampling data points within the latent space representation for the data set that are consistent with the predetermined set of labels, utilizing rejection sampling; and converting the sampled data points from a latent space representation to a data representation, utilizing the trained decoder.

In this way, sampling may be performed on an intersection of multiple attribute labels, even if the number of samples in that intersection is small.

In another general aspect, a computer program product for generating attribute-based samples includes a computer readable storage medium having program instructions embodied therewith, where the computer readable storage medium is not a transitory signal per se, and where the program instructions are executable by a processor to cause the processor to perform a method including training, by the processor, an encoder and decoder of a latent variable model (LVM), utilizing labeled data and unlabeled data within a data set; creating, by the processor, a latent space representation for the data set; determining, by the processor, an explicit density model for the data set, utilizing the latent space representation for the data set; determining, by the processor, a set of classifiers to identify which regions of the latent space representation are consistent with a predetermined set of labels; sampling, by the processor, data points within the latent space representation for the data set that are consistent with the predetermined set of labels, utilizing rejection sampling; and converting, by the processor, the sampled data points from a latent space representation to a data representation, utilizing a trained decoder of the LVM.

In this way, new labeled data may be created in a more efficient and effective manner, which may reduce an amount of computing resources (e.g., processing, storage, power, etc.) necessary to generate such labeled data.

FIG. 1 illustrates an architecture 100, in accordance with one aspect. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one aspect.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some aspects.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
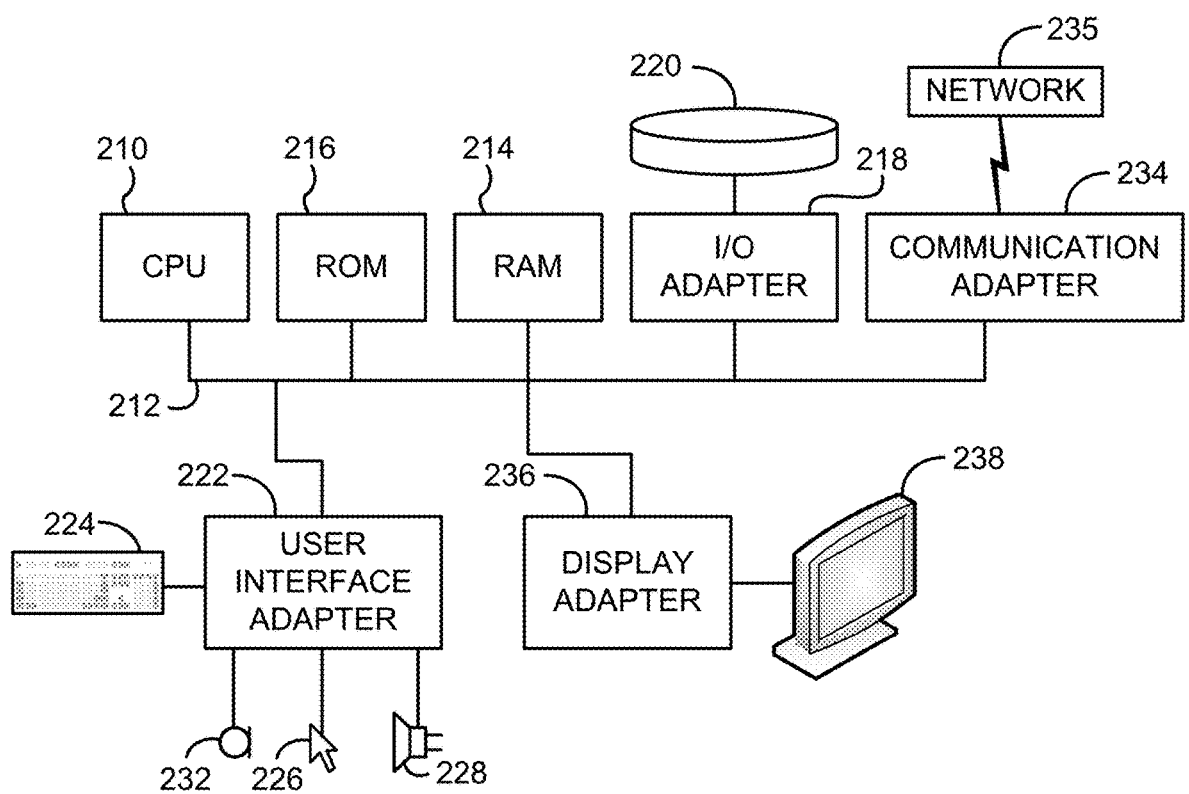
FIG. 2 shows a representative hardware environment that may be associated with the servers and/or clients of FIG. 1, in accordance with one aspect of the present invention.

FIG. 2 shows a representative hardware environment associated with a user device 116 and/or server 114 of FIG. 1, in accordance with one aspect. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred aspect may also be implemented on platforms and operating systems other than those mentioned. A preferred aspect may be written using XML, C, and/or C++ language, or other programming languages, along with an object oriented programming methodology. Object oriented programming (OOP), which has become increasingly used to develop complex applications, may be used.

Figure 3:
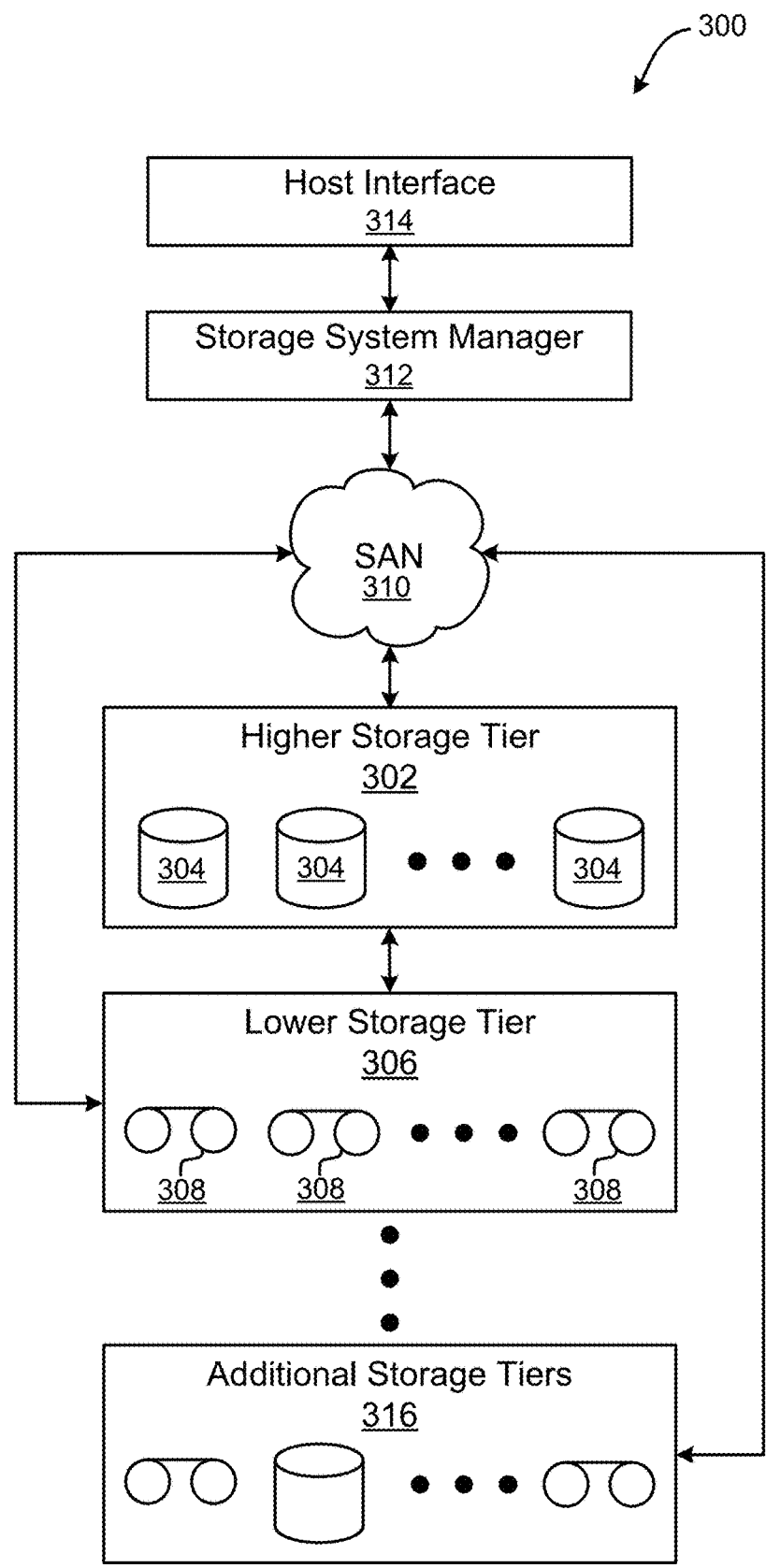
FIG. 3 illustrates a tiered data storage system in accordance with one aspect of the present invention.

Now referring to FIG. 3, a storage system 300 is shown according to one aspect. Note that some of the elements shown in FIG. 3 may be implemented as hardware and/or software, according to various aspects. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more aspects, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the aspects presented herein.

According to some aspects, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various aspects.

Figure 4:
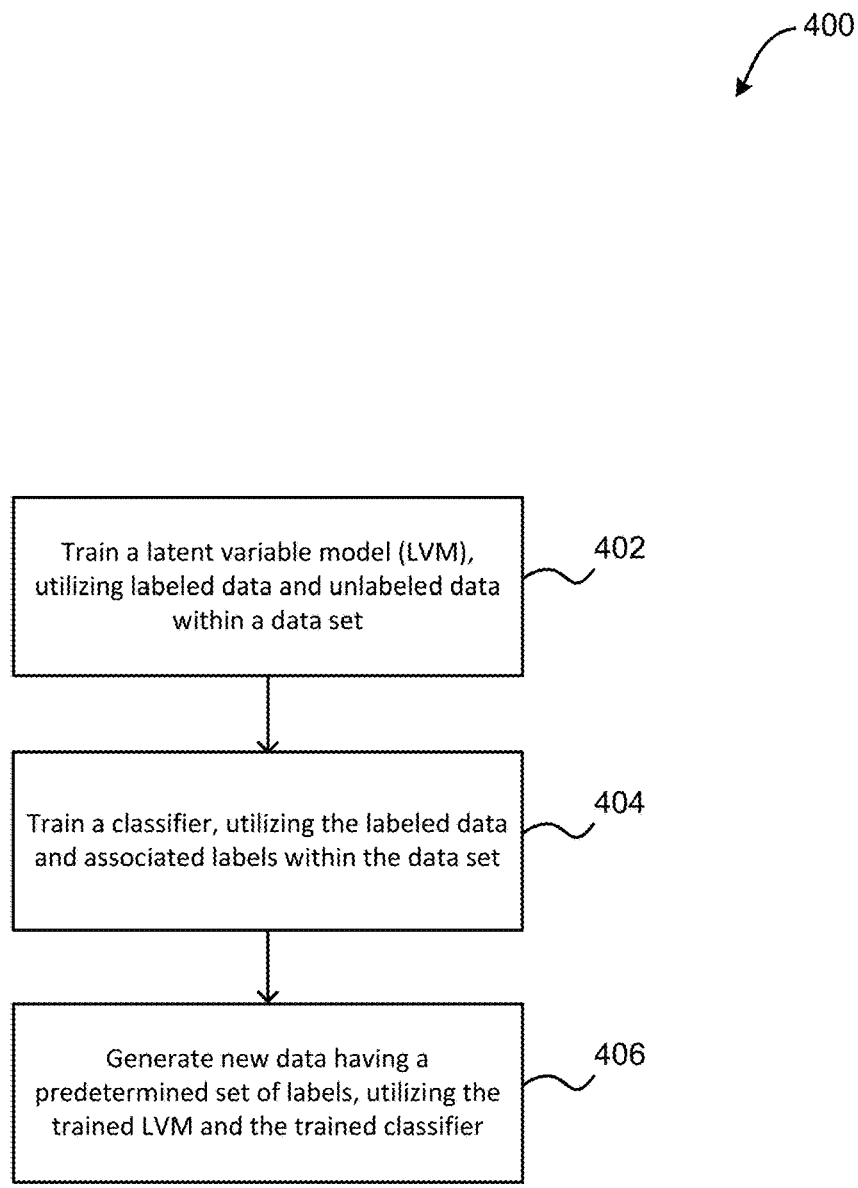
FIG. 4 illustrates a method for generating attribute-based samples, in accordance with one aspect of the present invention.

Now referring to FIG. 4, a flowchart of a method 400 is shown according to one aspect. The method 400 may be performed in accordance with the present invention in any of the environments depicted in FIGS. 1-3 and 6-7, among others, in various aspects. Of course, greater or fewer operations than those specifically described in FIG. 4 may be included in method 400, as would be understood by one of skill in the art upon reading the present descriptions.

Each of the steps of the method 400 may be performed by any suitable component of the operating environment. For example, in various aspects, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a latent variable model (LVM) is trained, utilizing labeled data and unlabeled data within a data set. In one aspect, the data set may include a set of individual instances of data. For example, the data set may include a plurality of instances of data. In another aspect, the data may be of any type (including, for example, natural language sentences, peptides, images, etc.).

Additionally, in one aspect, the labeled data may include instances of data within the data set that include an associated label. For example, the associated label may indicate an attribute of the labeled data. In another example, an instance of labeled data may include an image with a "smile" label indicating that a person within the image is smiling. In yet another example, another instance of labeled data may include a predetermined word label indicating that one or more predetermined words are located within a sentence.

Further, in one aspect, unlabeled data may include instances of data within the data set that do not include an associated label. For example, an amount of unlabeled data may be greater than an amount of labeled data within the data set. In another aspect, the LVM may include an encoder and a decoder. For example, both the encoder and the decoder may include neural networks.

Further still, in one aspect, the LVM may include a variational autoencoder (VAE), a Wasserstein autoencoder (WAE), an adversarial autoencoder (AAE), a general adversarial network (GAN), etc. In another aspect, training the LVM may include training the encoder and the decoder. In yet another aspect, the encoder and decoder may be trained with just the labeled and unlabeled data, without using associated labels for the labeled data.

Also, in one aspect, training the LVM may include creating a latent space representation for the data set. For example, the latent space representation may include a representation of the labeled and unlabeled data resulting from applying the labeled and unlabeled data to the encoder of the LVM. In another aspect, training the LVM may include determining a reconstruction loss and a regularization loss. For example, the reconstruction loss may be used to reconstruct data from its representation in the latent space. In another example, the regularization loss may provide structure to the data represented in the latent space representation. In still another example, the regularization loss may be used for generating new data points.

In addition, method 400 may proceed with operation 404, where a classifier is trained utilizing the labeled data and associated labels within the data set. In one aspect, the associated labels may include the labels for the labeled data within the data set. In another aspect, training the classifier may include determining an explicit density model for the data set.

For example, training the classifier may include embedding every labeled data point in the latent space representation in order to create the explicit density model. In another example, the explicit density model may explicitly capture how the labeled data is arranged within the latent space representation.

Furthermore, in one aspect, the encoder of the LVM may provide the latent space representation of the data set. In another aspect, the explicit density model may determine parametric approximations of the latent space representation. In yet another aspect, the classifier may be used to associate the labels for the labeled data with the latent space representation of the data set.

For example, the encoder may map data points to a latent variable z. In another example, the classifier may then predict a label for a data point based on its latent variable (z) representation.

Further still, in one aspect, the classifier may include one or more neural networks.

Also, method 400 may proceed with operation 406, where new data having a predetermined set of labels is generated, utilizing the trained LVM and the trained classifier. In one aspect, each predetermined label of the predetermined set of labels may include one of the associated labels for the labeled data. For example, a predetermined label may include a "smile" label indicating that a person within the image is smiling, an inclusion of one or more predetermined words within a sentence, etc.

Additionally, in one aspect, generating the new data may include sampling (e.g., selecting) data points within the latent space representation that are consistent with the predetermined set of labels. For example, the sampling may be performed utilizing the explicit density model and the trained classifier. In another aspect, generating the new data may include determining an explicit density model for the data set in the latent space representation.

Further, in one aspect, the sampling may be performed utilizing a mathematically rigorous method. For example, the mathematically rigorous method may include rejection sampling. For instance, rejection sampling may include a method of sampling from a complex distribution by creating a simpler proxy distribution. In another example, rejection sampling may be used to sample points in the latent space representation that have the predetermined set of labels by identifying a region of interest (e.g., a region associated with the predetermined set of labels) within the latent space representation. In another aspect, Bayes' rule may be applied during the rejection sampling.

Further still, in one aspect, generating the new data may include converting the sampled data points from a latent space representation to a data representation, utilizing the trained decoder within the trained LVM. For example, the trained decoder may take the latent space representation of a data point as input, and may create the data point utilizing the latent space representation. For instance, the trained decoder may create a new image, natural language sentence, etc., based on an identified latent space representation of the image. In another aspect, the data representation generated by the trained decoder may have the predetermined set of labels.

Also, in one aspect, generating the new data may include sampling (e.g., selecting) data points within the latent space representation that are consistent with a plurality of predetermined labels. For example, the sampled data points may then be converted from the latent space representation to the data representation, utilizing the trained decoder within the trained LVM.

In addition, in one aspect, the new data may include data that was not in the original data set but that is consistent with data in the original data set having the predetermined set of labels. In another aspect, the new data may be added to the data set.

In this way, new instances of data may be generated for a data set that contains both labeled and unlabeled instances of data, where such instances of data have a desired label, or a plurality of desired labels. Additionally, labels may not need to be defined prior to training the LVM, as new labels may be determined on-the-fly after training the LVM. Further, only a small amount of labeled data may be necessary per labeled attribute. Further still, sampling may be performed on an intersection of multiple attribute labels, even if the number of samples in that intersection is small. Further, the above implementation may be performed utilizing many different LVM formulations. As a result, new labeled data may be created in a more efficient and effective manner, which may reduce an amount of computing resources (e.g., processing, storage, power, etc.) necessary to generate such labeled data.

Figure 5:
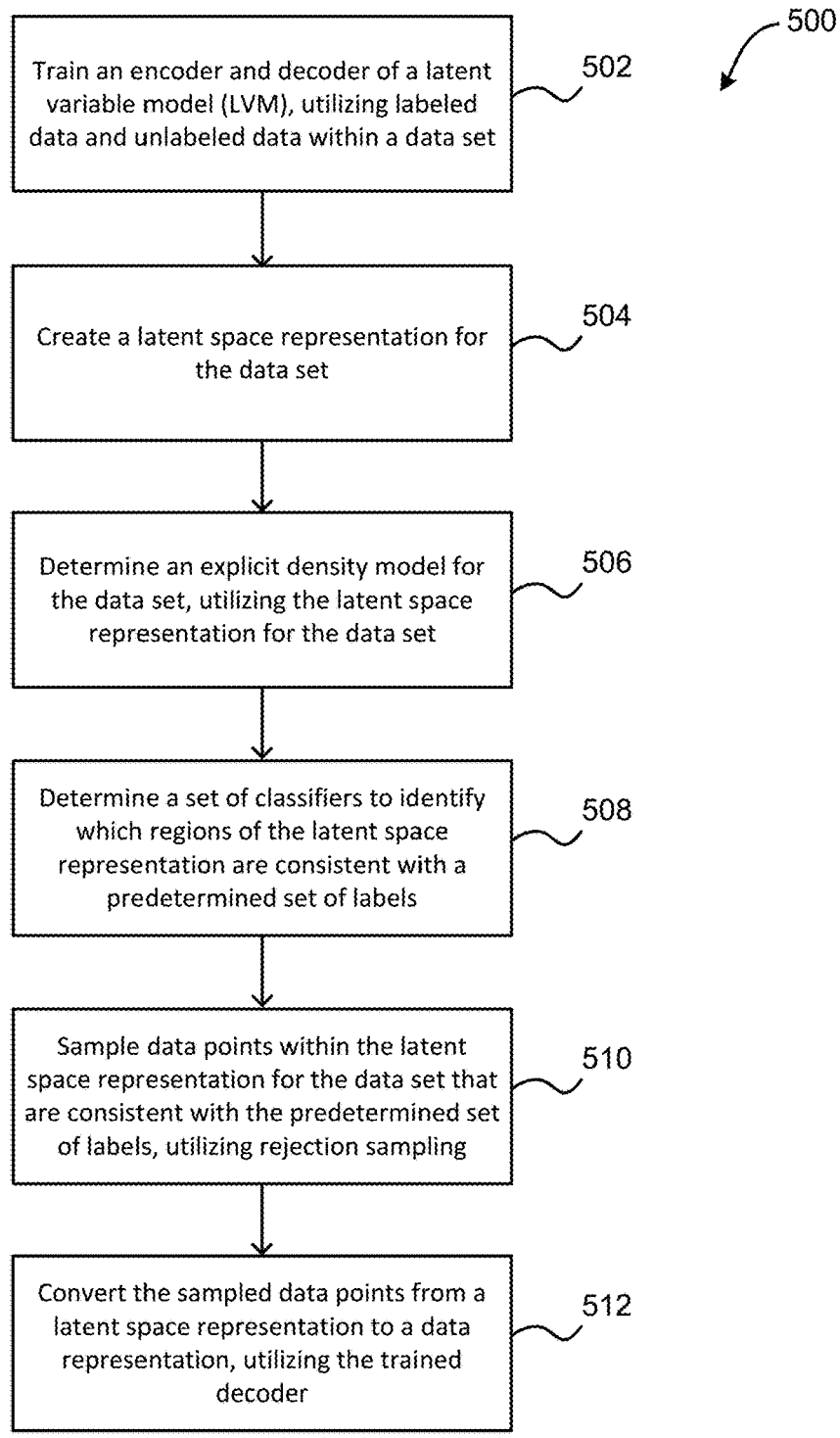
FIG. 5 illustrates a method for performing controlled attribute-based sample generation from unconditionally trained latent variable models, in accordance with one aspect of the present invention.

Now referring to FIG. 5, a flowchart of a method 500 for performing controlled attribute-based sample generation from unconditionally trained latent variable models is shown according to one aspect. The method 500 may be performed in accordance with the present invention in any of the environments depicted in FIGS. 1-3 and 6-7, among others, in various aspects. Of course, greater or fewer operations than those specifically described in FIG. 5 may be included in method 500, as would be understood by one of skill in the art upon reading the present descriptions.

Each of the steps of the method 500 may be performed by any suitable component of the operating environment. For example, in various aspects, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where an encoder and decoder of a latent variable model (LVM) are trained, utilizing labeled data and unlabeled data within a data set. Additionally, method 500 may proceed with operation 504, where a latent space representation is created for the data set. Further, method 500 may proceed with operation 506, where an explicit density model for the data set is determined utilizing the latent space representation for the data set. In addition, method 500 may proceed with operation 508, where a set of classifiers is determined to identify which regions of the latent space representation are consistent with a predetermined set of labels. In one aspect, one set of classifiers may be determined per attribute.

Further still, method 500 may proceed with operation 510, where data points are sampled within the latent space representation for the data set that are consistent with a predetermined set of labels, utilizing rejection sampling. Also, method 500 may proceed with operation 512, where the sampled data points are converted from a latent space representation to a data representation, utilizing the trained decoder.

Controlled (Attribute-Based) Sample Generation from Unconditionally Trained Latent Variable Models In one aspect, a method is presented to generate new samples that are similar to a dataset, while controlling a set of attributes. Examples of samples/datasets are natural language sentences, peptides, images, etc. The method may be presented in the "latent variable model" paradigm, which includes VAE, WAE, GANs, ALI, etc. The latent space will be written as "z".

Note that the method is agnostic to the exact formulation used. The only assumptions made on the LVM is that: we have an encoder $q(z|x)$ to encode an existing sample in the latent space, a decoder/generator $p\_theta(x|z)$ that reconstructs the sample given its encoding, and a prior $p(z)$ from where new samples are generated. The latent variable model has been trained such that $p(z) p\_theta(x|z)$ approximates the data distribution $p\_d(x)$.

Through the form $p(z) p(x|z)$, these models provide a way to sample new data (first sample z from prior, then sample $p(x|z)$). However, what is missing is a way to sample data that meets certain criteria or attributes. This is a form of constrained generation, where the constraints are imposed by attributes.

In another aspect, realistic samples may be generated while controlling a set of attributes. In order to control for attributes, some data is needed where these attributes are human labeled. The notion of subset datasets is introduced, for attribute 'a_i' taking value 'y_i'. This subset defines distribution $p\_s(x)$, which may have overlap with other subsets.

The attribute-based generation problem may be addressed in two ways: (A) introducing new latent variables and objectives during training of the LVM, or (B) modeling the attributes in the latent space without adding additional objectives.

In (A), the aim of the additional variables and objectives is to explicitly make the additional latent variables capture the attributes of interest. For example, a single categorical y and another layer of continuous latent variables z_2 is introduced. In another example, a method may rely on a set of new discrete binary variables to control the attributes, an ad-hoc wake-sleep procedure, and results are hard to reproduce.

These approaches introduce additional complexity, do not allow capturing more than a single attribute, and require that the attributes have to be specified ahead of time and are hard-baked into the model. Further, the additional objective terms of these approaches are specific to the underlying formulation, and many approaches require all data points to be fully labeled with all attributes.

In contrast, the current method falls in under (B), where the training objective is not modified. Rather, given a trained LVM, it is assumed that the latent space has learned a meaningful representation, which intrinsically retains the attribute information.

In response, a pre-trained latent variable model may be used to enable attribute-conditioned sampling by training an explicit parametric density model in the latent space. To condition on multiple attributes, a parametric density model Q_xi(z) is fit on the encodings q(z|x) of all training data, and independent attribute classifiers are trained in z-space for attributes (a1, a2, ... a_n) for which partial labels exist. Further, rejection sampling is performed to sample Q(z|a1, a2, ..., a_n).

One exemplary pipeline to generate novel samples while controlling attributes a1, a2, ... a_n (2nd formulation) has the following steps:

1) Train the latent variable model, encoder q(z|x) and decoder p_theta(x|z).

2) Encode all datapoints in the latent space and sample the encoding distributions q(z|x) K times. The resulting samples form D_z~q_phi(z): D_z={zj, k~q(z|x j) for x j in training dataset, k=1 ... K independent samples}.

3) Fit an explicit parametric model Q_xi(z) to maximize total data log likelihood E_{D_z}[log Q_xi(z)]. Q_xi(z) is a simple explicit density estimator with parameters xi, e.g. Gaussian, mixture of gaussians, normalizing flow density estimator, etc.

4) Fit independent classifiers for each attribute: p(ai|z), e.g. simply logistic regression: p(a11 z), p(a21 z), ... p(an|z).

5) Sample {zj, j=1 ... M}~Q(z|a1, ... an) using rejection sampling, using Q(z) as proposal distribution and accept the sample with probability p(a1 ... an|z)=p(a11 z) ... p(an|z) factorizing out into the product of probabilities from the independent classifiers.

6) Decode the sample {zjj=1 ... M} with the LVM decoder: {xj~p_theta(x|zj) j=1 ... M}.

The advantages of the above method include the following:

(1) There is no need to define attributes before training the latent variable model—new attributes can be defined on the fly (i.e. after training the latent variable model).

(2) Small amounts of labeled data exist per attribute, and non-overlapping attribute labels are handled naturally.

(3) Sampling is performed on the intersection of multiple attributes, even though the number of samples in that intersection can be small.

(4) The approach is agnostic to formulation of latent variable model (VAE, WAE, AAE, GAN, etc.), as long as it has the form p(z) p(x|z).

Figure 6:
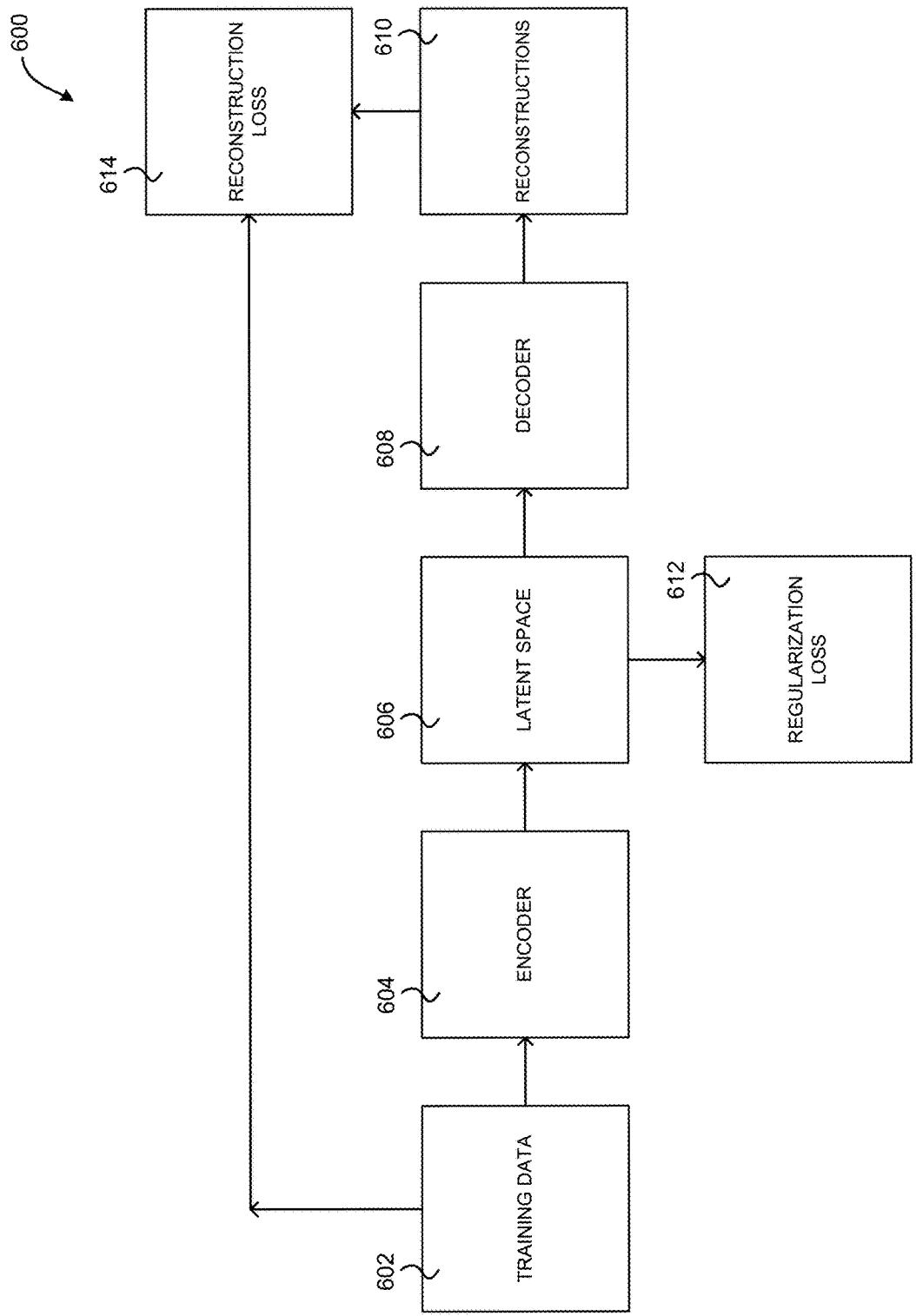
FIG. 6 illustrates an exemplary training of a latent variable model, in accordance with one aspect of the present invention.

FIG. 6 illustrates an exemplary training of a latent variable model 600, according to one exemplary aspect. As shown, training data 602 is input into an encoder 604 of the latent variable model 600, which creates a latent space representation 606 of the training data 602. A decoder 608 is then trained to convert the latent space representation 606 into reconstructed data 610. A regularization loss 612 and a reconstruction loss 614 are also calculated.

In one aspect, unsupervised learning of meaningful continuous latent representation z is performed. The method is agnostic to latent variable model (VAE/WAE/ALI/GAN/ ... ). For example, the above figure shows the AE family (reconstruction+regularization). In the VAE family, the regularization loss equals the divergence with prior p(z):

VAE: KL(q_θ($z$|x)||p(z))
AAE: Discriminator: maximize log D(q(z))
WAE: MMD(q_φ(z)||p(z))

Figure 7:
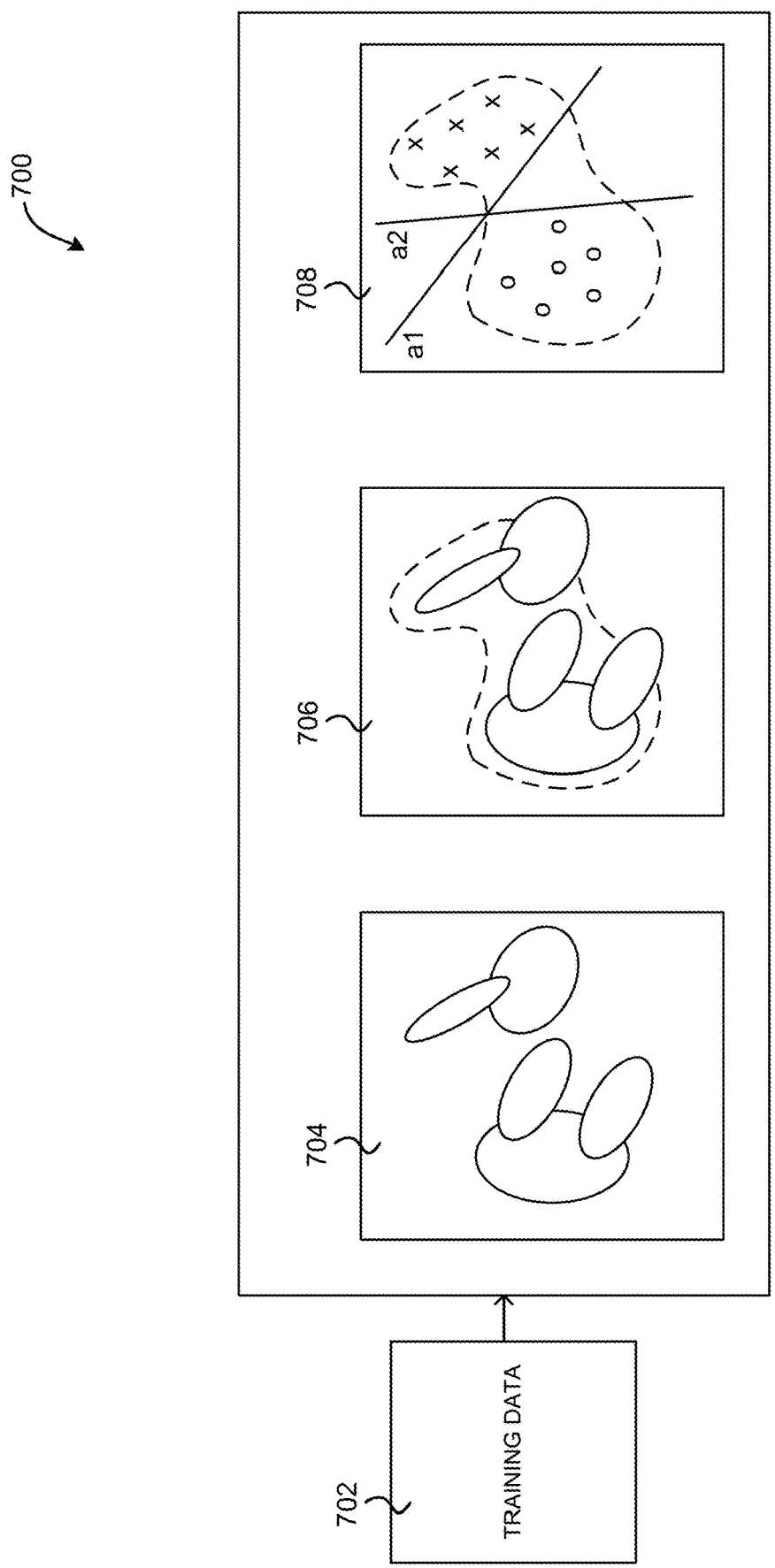
FIG. 7 illustrates an exemplary fitting of models within z-space, in accordance with one aspect of the present invention.

FIG. 7 illustrates an exemplary fitting of models within z-space 700, according to one exemplary aspect. As shown, training data including attribute labels 702 is input into an encoder to create encoded training data 704. For example, the training data may be encoded with q(z|x). In another example, the training data may sample $z_{j,k}$~q(z).

For instance, all (unlabeled) training data may be encoded:

$$\{z_{j,k} \sim q_\phi(z|x_j), j=1 \ldots N, k=1 \ldots K\}$$

They are the samples that define the marginal posterior:

$$q_\phi(z) = \mathbb{E}_x[q_\phi(z|x)]$$

Additionally, an explicit density model 706 is fit onto the encoded training data. The explicit density model 706 may include $Q_\xi(z) \approx q_\phi(z)$. Further, a classifier is then used to associate the attribute labels for the training data 702 with a latent space representation of the data set 708. For example, for each attribute $a_i$, a classifier $q_\xi(a_i | z)$ may be fit.

For instance, For each attribute $a_i$:
Labeled dataset $D_i = \{(x_j, a_i = y_j), j=1 \ldots N_i\}$ is collected. Labeled data is then encoded:

$$\{(z_{j,k}, a_i = y_j), j=1 \ldots N_i, k=1 \ldots K\} \text{ with } z_{j,k} \sim q_\phi(z|x_j)$$

Classifier $q_\xi(a_i | z)$ is then fit.

In one aspect, attribute conditional sampling $z_j$ may be performed within the latent space representation, as follows:

$$p(z | a) \propto p(z) \prod_i p(a_i | z) \approx Q_\xi(z) \prod_i q_\xi(a_i | z).$$

For example, rejection sampling of Q(z|a1, ... an) may be performed. For example, {zj, j=1 ... M}~Q(z|a1, ... an) may be sampled using rejection sampling, using Q(z) as proposal distribution and p(a1 ... an|z)=p(a11 z) ... p(an|z) factorizing out into the independent classifiers. One exemplary algorithm is as follows:

Sample z~Q_xi (proposal distribution)
Accept with probability f(z)/M g(z)=p(a1|z) ... p(an|z) the product of classifier scores.

Further still, in one aspect, decoding is performed on the samples $z_j$, where j=1–M. For example, the samples $z_j$~p(z|a) may be decoded using the trained decoder 608 of FIG. 6 to obtain the new labeled samples.

Rejection Sampling Details

In one aspect, a VAE/WAE latent variable model may include an encoder $q_\phi(z|x)$, a decoder $p_\theta(x|z)$, training data $\{x_j; j=1 \ldots N\}$ iid from p(x) data distribution. The marginal posterior calculation is as follows:

$$q_\phi(z) = \frac{1}{N}\sum_{j=1}^{N} q_\phi(z | x_j)$$

There are n different attributes a∈$\mathbb{R}^n$=[$a_1, a_2, \ldots, a_n$], each of which may have only a small set of labeled datapoints in the training data.

However for all datapoints that have those (unlabeled) attributes, the data distribution implicitly is generated as:

$$p(x) = \mathbb{E}_{a \sim p(a)}[p(x|a)].$$

Rejection sampling notation is used for f(z), M, and g(z).

To sample p(z|a), Bayes' rule is used, as well as the conditional independence of the attributes $a_i$ conditioned on z, since it is assumed that the latent variable captures all information to model the attributes: $a_i \perp a_j | z|$:

$$p(z|a) = \frac{P(a|z)q_\phi(z)}{p(a)}$$

$$= \frac{q_\phi(z)\prod_i p(a_i|z)}{p(a)}$$

$$\propto q_\phi(z)\prod_i p(a_i|z)$$

$$\approx Q_\xi(z)\prod_i q_\xi(a_i|z)$$

In the last step the parametric approximations are introduced and the set of all parameters $\xi$ are named:

1. $q_\phi(z) = \mathbb{R}_x[q_\phi(z|x)]$ is modeled with an explicit density estimator $Q_\xi(z)$ for example gaussian, mog, normalizing flow, etc. To fit $Q_\xi$, the training datapoint $x_j$'s encoding distribution K is sampled times $$z_{j,k} \sim q_\phi(z|x_j) = \mathcal{N}(\mu(x_j), \sigma(x_j)) \text{ with } k=1 \ldots K.$$

2. Independent simple classifiers $q_\xi(a_i|z)$ are learned per attribute, e.g. via logistic regression or SVM.

The denominators $p(a)/q_\xi(a)$ are dropped since they are not needed for rejection sampling, and furthermore they would need to be estimated by integrating out z in the enumerator:

$$q\xi(a) = \mathbb{R}_{Q\xi(z)} q\xi(a|z),$$

which is expensive. Rejection sampling is performed through the proposal distribution:

$$g(z) = Q\xi(z),$$

which can be directly sampled. Now $M = 1/q\xi(a)$ is set so $Mg(z) = Q\xi(z)/q\xi(a)$, while the pdf to sample from $f(z) = Q\xi(z)\prod_i q\xi(a_i|z)/q\xi(a)$.

So the sample from $Q\xi(z)$ is accepted with probability:

$$\frac{f(z)}{Mg(z)} = \prod_i q_\xi(a_i|z).$$

This is an intuitive result—the sample is accepted with a probability equal to the product of the classifiers' scores. In order to accept any samples a region in z space needs to exist where $Q\xi(z)>0$ and the classifiers assign nonzero probability to all desired attributes, i.e. the combination of attributes has to be realizable in z-space.

Further, in one aspect, a method is provided to sample conditionally on an unconditionally trained latent variable model, allowing sparse attribute labels. In another aspect, a method is provided to fit parametric approximations to a marginal posterior $Q\xi(z) \approx q\phi(z)$, with attribute probabilities $q\xi(a_i|z)$.

In yet another aspect, a rejection sampling algorithm is provided to conditionally sample a distribution $p(z|a)$ using parametric approximations for $q(z)$ and $p(a_i|z)$. In still another aspect, a pipeline is provided to sample z from an explicit density model, and filter with a combination of classifiers in latent space and/or xspace, rejecting samples without desired attributes.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to aspects of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various aspects may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that aspects of the present invention may be provided in the form of a service deployed on behalf of a customer to offer service on demand.

The descriptions of the various aspects of the present invention have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

What is claimed is:

1. A computer-implemented method, comprising:
    training an encoder and a decoder of a latent variable model (LVM), utilizing labeled data and unlabeled data within a data set, wherein the LVM is selected from the group consisting of: a variational autoencoder (VAE), a Wasserstein autoencoder (WAE), an adversarial autoencoder (AAE), and a general adversarial network (GAN);
    creating a latent space representation for the data set;
    determining an explicit density model for the data set, utilizing the latent space representation for the data set;
    determining a set of classifiers to identify which regions of the latent space representation are consistent with a predetermined set of labels;
    sampling data points within the latent space representation for the data set that are consistent with a predetermined set of labels, utilizing rejection sampling; and
    converting the sampled data points from a latent space representation to a data representation, utilizing the trained decoder.

2. The computer-implemented method of claim 1, comprising training a classifier, utilizing the labeled data and associated labels within the data set; and generating new data having a predetermined set of labels, utilizing the LVM and the trained classifier.

3. The computer-implemented method of claim 1, comprising training a classifier, utilizing the labeled data and associated labels within the data set; and generating new data having a predetermined set of labels, utilizing the LVM and the trained classifier, wherein generating the new data includes determining an explicit density model for the data set in the latent space representation.

4. The computer-implemented method of claim 2, wherein the classifier is used to associate labels for the labeled data with the latent space representation of the data set.

5. The computer-implemented method of claim 2, wherein generating the new data includes sampling data points within the latent space representation that are consistent with the predetermined set of labels.

6. The computer-implemented method of claim 5, wherein the sampling is performed utilizing an explicit density model and the trained classifier.

7. The computer-implemented method of claim 5, wherein the sampling includes rejection sampling that is used to sample points in the latent space representation that have the predetermined set of labels by identifying a region associated with the predetermined set of labels within the latent space representation.

8. The computer-implemented method of claim 7, wherein Bayes' rule is applied during the rejection sampling.

9. A computer program product for generating attribute-based samples, the computer program product comprising a computer readable storage medium having program instructions embodied therewith, wherein the computer readable storage medium is not a transitory signal per se, the program instructions executable by a processor to cause the processor to perform a method comprising:
   training, by the processor, an encoder and a decoder of a latent variable model (LVM), utilizing labeled data and unlabeled data within a data set, wherein the LVM is selected from the group consisting of: a variational autoencoder (VAE), a Wasserstein autoencoder (WAE), an adversarial autoencoder (AAE), and a general adversarial network (GAN);
   creating, by the processor, a latent space representation for the data set;
   determining, by the processor, an explicit density model for the data set, utilizing the latent space representation for the data set;
   determining, by the processor, a set of classifiers to identify which regions of the latent space representation are consistent with a predetermined set of labels;
   sampling, by the processor, data points within the latent space representation for the data set that are consistent with a predetermined set of labels, utilizing rejection sampling; and
   converting, by the processor, the sampled data points from a latent space representation to a data representation, utilizing the trained decoder.

10. The computer program product of claim 9, comprising:
    training, by the processor, a classifier, utilizing the labeled data and associated labels within the data set, wherein the classifier is used to associate labels for the labeled data with the latent space representation of the data set.

11. The computer program product of claim 9, comprising:
    training, by the processor, a classifier, utilizing the labeled data and associated labels within the data set; and
    generating, by the processor, new data having a predetermined set of labels, utilizing the LVM and the trained classifier, wherein generating the new data includes sampling data points within the latent space representation that are consistent with the predetermined set of labels.

12. The computer program product of claim 11, wherein the sampling is performed utilizing an explicit density model and the trained classifier.

13. The computer program product of claim 11, wherein the sampling includes rejection sampling that is used to sample points in the latent space representation that have the predetermined set of labels by identifying a region associated with the predetermined set of labels within the latent space representation.

14. The computer program product of claim 13, wherein Bayes' rule is applied during the rejection sampling.

15. A system, comprising:
    a processor; and
    logic integrated with the processor, executable by the processor, or integrated with and executable by the processor, the logic being configured to:
    train an encoder and a decoder of a latent variable model (LVM), utilizing labeled data and unlabeled data within a data set, wherein the LVM is selected from the group consisting of: a variational autoencoder (VAE), a Wasserstein autoencoder (WAE), an adversarial autoencoder (AAE), and a general adversarial network (GAN);
    create a latent space representation for the data set;
    determine an explicit density model for the data set, utilizing the latent space representation for the data set;
    determine a set of classifiers to identify which regions of the latent space representation are consistent with a predetermined set of labels;
    sample data points within the latent space representation for the data set that are consistent with a predetermined set of labels, utilizing rejection sampling; and
    convert the sampled data points from a latent space representation to a data representation, utilizing the trained decoder.

16. A computer-implemented method, comprising:
    training an encoder and decoder of a latent variable model (LVM), utilizing labeled data and unlabeled data within a data set, wherein the LVM is selected from the group consisting of: a variational autoencoder (VAE), a Wasserstein autoencoder (WAE), an adversarial autoencoder (AAE), and a general adversarial network (GAN);
    creating a latent space representation for the data set;
    determining an explicit density model for the data set, utilizing the latent space representation for the data set;
    determining a set of classifiers to identify which regions of the latent space representation are consistent with a predetermined set of labels;
    sampling data points within the latent space representation for the data set that are consistent with the predetermined set of labels, utilizing rejection sampling; and
    converting the sampled data points from a latent space representation to a data representation, utilizing the trained decoder.

17. A computer program product for generating attribute-based samples, the computer program product comprising a computer readable storage medium having program instructions embodied therewith, the program instructions executable by a processor to cause the processor to perform a method comprising:
    training, by the processor, an encoder and decoder of a latent variable model (LVM), utilizing labeled data and unlabeled data within a data set, wherein the LVM is selected from the group consisting of: a variational autoencoder (VAE), a Wasserstein autoencoder (WAE), an adversarial autoencoder (AAE), and a general adversarial network (GAN);

creating, by the processor, a latent space representation for the data set;

determining, by the processor, an explicit density model for the data set, utilizing the latent space representation for the data set;

determining, by the processor, a set of classifiers to identify which regions of the latent space representation are consistent with a predetermined set of labels;

sampling, by the processor, data points within the latent space representation for the data set that are consistent with the predetermined set of labels, utilizing rejection sampling; and converting, by the processor, the sampled data points from a latent space representation to a data representation, utilizing a trained decoder of the LVM.

* * * * *